United States Patent
Muroki

[15] 3,665,711
[45] May 30, 1972

[54] EXHAUST GAS PURIFYING DEVICE FOR AN INTERNAL COMBUSTION ENGINE

[72] Inventor: Takumi Muroki, Hiroshima, Japan

[73] Assignee: Toyo Kogyo Company Limited, Aki-gun, Hiroshima, Japan

[22] Filed: June 9, 1970

[21] Appl. No.: 44,847

[30] Foreign Application Priority Data

June 6, 1969 Japan.....................44/54407

[52] U.S. Cl..............................60/286, 23/277 C, 60/290, 60/298
[51] Int. Cl.............................................F01n 3/10
[58] Field of Search.......................60/30, 31; 23/277 C

[56] References Cited

UNITED STATES PATENTS

| | | | |
|---|---|---|---|
| 1,839,880 | 1/1932 | Hyatt | 60/294 |
| 3,168,806 | 2/1965 | Calvert | 60/284 |
| 3,203,168 | 8/1965 | Thomas | 60/286 |
| 3,248,872 | 5/1966 | Morrell | 60/274 |
| 3,392,523 | 7/1968 | Hyde | 60/290 |
| 3,397,534 | 8/1968 | Knowles | 60/290 |

Primary Examiner—Douglas Hart
Attorney—Sughrue, Rothwell, Mion, Zinn & Macpeak

[57] ABSTRACT

An exhaust gas purifying device disposed in the exhaust system of an internal combustion engine which device has an inner shell forming a reaction chamber for reburning the exhaust gas and an outer shell surrounding the space outside of the inner shell. An air pump driven by the engine cools the inner and outer shells by introducing cooling air into the space between the shells through an engine parameter controlled valve.

4 Claims, 1 Drawing Figure

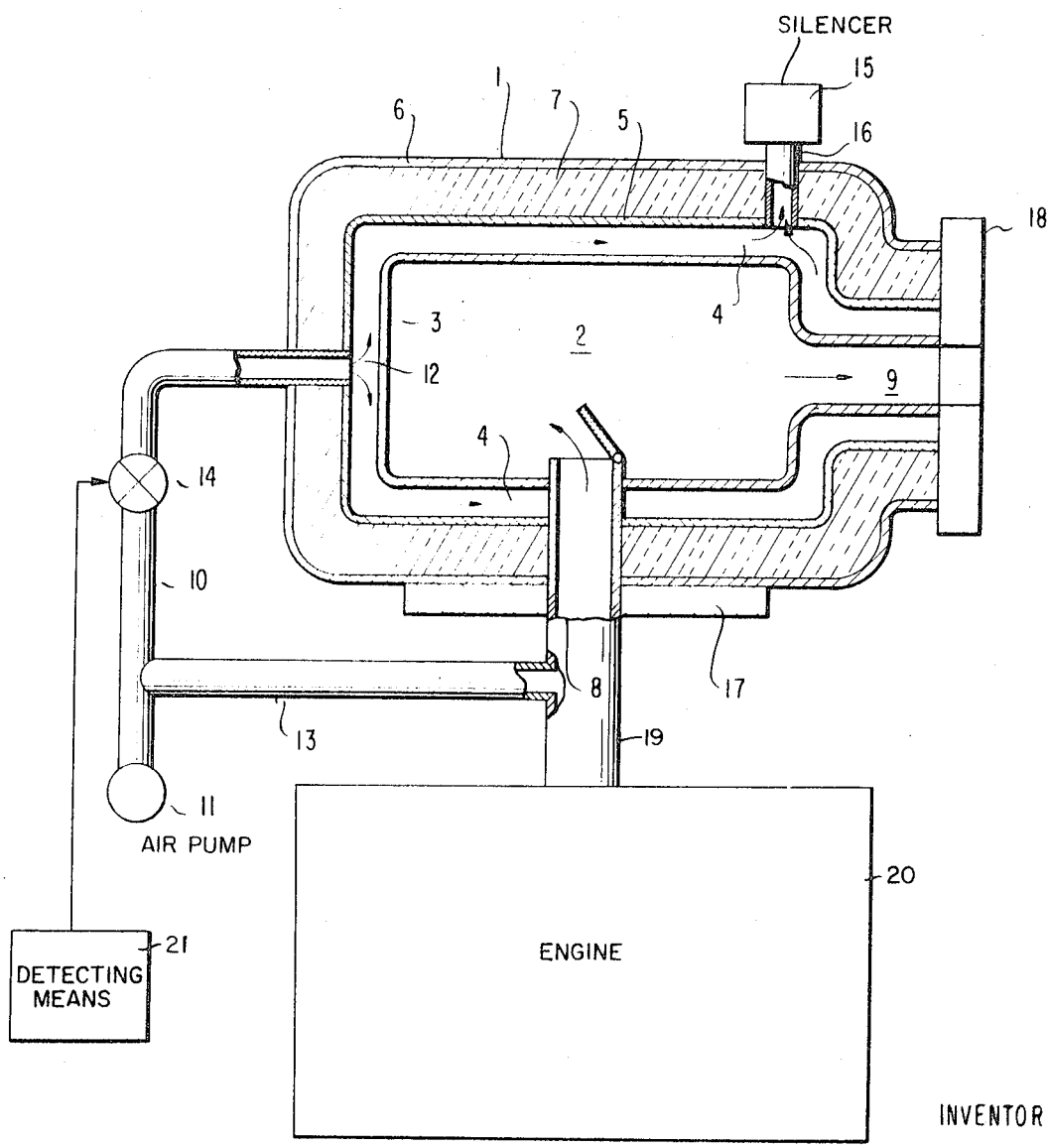
INVENTOR
TAKUMI MUROKI

EXHAUST GAS PURIFYING DEVICE FOR AN INTERNAL COMBUSTION ENGINE

BACKGROUND OF THE INVENTION

This invention relates to an exhaust gas purifying device for an internal combustion engine and, more particularly, to an improvement of such a device.

It is generally well known that an exhaust gas purifying reactor which has a multiple wall structure defining a low heat transfer space between the walls prevents the high temperature of the exhaust gas and the combustion heat in the reaction chamber from radiating to the exterior of the reactor and maintains a higher temperature inside of the reaction chamber than a reactor having a single wall structure. Consequently, exhaust gas is more thoroughly purified in the former device than in the latter device. However, in a reactor having an inner shell forming a reaction chamber and an outer shell surrounding the outside of the inner shell and defining therewith a low heat transfer space, the inner shell is heated by the combustion heat generated in the reaction chamber and by the heat of the exhaust gas itself. Thus, the dissipation of heat from the inner shell into the restricted low heat transfer space causes this space to reach an extremely high temperature. Accordingly, the inner shell tends to corrode or crack. To endure such high temperatures, the inner shell must be made of very expensive heat resistive and anti-corrosive material and even this material is not heat resistive enough to endure severe conditions.

Since the outer shell is affected by the high temperature of the inner shell and becomes 400° – 500° C, the temperature within the engine room provided with such an exhaust gas purifying device becomes very hot which reduces the durability of the auxiliary equipment within the engine room as well as making the engine room a highly unpleasant working atmosphere for humans.

SUMMARY OF THE INVENTION

It is one object of this invention to eliminate the aforementioned disadvantages of conventional exhaust gas purifying devices and to provide an improved reactor for an exhaust gas purifying device.

It is a further object of the present invention to provide an exhaust gas purifying device for an internal combustion engine which comprises a reactor having an inner shell forming a reaction chamber and an outer shell surrounding the outside of the inner shell, and defining between the shells a space, and supplying cooling air to this space for preventing the temperature of the inner shell from increasing.

It is another object of this invention to provide an exhaust gas purifying device for an internal combustion engine which comprises control means for controlling the cooling air flow to the space between the inner and outer shell in response to operating conditions thereby improving the durability of the reactor shells without lowering the purifying function of the reactor.

It is a further object of the present invention to provide an exhaust gas purifying device which supplies secondary air to the exhaust gas system of an internal combustion engine by the same air pump which supplies cooling air to the reactor.

It is still another object of the present invention to provide an exhaust gas purifying device which controls the secondary air supplied to the exhaust gas system of an internal combustion engine and the cooling air supplied to a reactor in response to the operating state of an engine.

Other objects, features and advantages of the present invention will become apparent from the following description taken in conjunction with the accompanying drawing.

BRIEF DESCRIPTION OF THE DRAWING

The following drawing shows a longitudinal sectional view of an embodiment of the exhaust gas purifying device of this invention.

DETAILED DESCRIPTION OF THE INVENTION

In the drawing, reference numeral 1 designates a reactor which comprises an inner shell 3 forming a reaction chamber 2, an end outer shell 5 surrounding the inner shell 3 and defining therewith a cooling space 4. An outer casing 6 surrounds the outside of the outer shell 5 through a low heat transfer space 7 which may be filled with insulating material. Inlet pipe 8 is connected to an exhaust pipe 19 of an internal combustion engine 20 for introducing the exhaust gas into the reaction chamber 2 through the outer casing 6, outer shell 5 and inner shell 3. Outlet 9 conducts the exhaust gas reburned within the reaction chamber 2 to the exhaust pipe. A conduit 10 feeds air from an air pump 11 into the cooling space 4 through air inlet 12 in the outer shell 5. Conduit 13 is branched from conduit 10 to supply secondary air for reburning the exhaust gas by communicating the branch conduit with the exhaust gas system, for example, at the exhaust port of the internal combustion engine. Said conduit 13 may connect anywhere in the exhaust gas system. An air control valve 14 is disposed in the conduit 10 so as to open when the engine or vehicle speed exceeds a predetermined value or when the vacuum of the inlet manifold falls below a predetermined value. Detecting means 21 provides a signal to valve 14 upon detection of a predetermined engine parameter, for example, engine or vehicle speed, intake manifold vacuum pressure, engine temperature, reactor temperature or exhaust temperature. An air outlet 16 communicates through outer shell 5 with the silencer 15 and the atmosphere. Flanges 17 and 18 connect the reactor 1 to the exhaust pipe 19.

The operation of the embodiment just described is as follows. If the vehicle speed falls below a predetermined level or if engine speed is below a predetermined value, the air control valve 14 is closed so that the air supplied by pump 11 all passes through branch conduit 13 as a secondary air and is fed into the exhaust gas system. Since the unburned detrimental components contained within the exhaust gas decrease when the engine speed increases, less secondary air is needed at higher speeds. Therefore, when the vehicle speed exceeds a predetermined value, the air control valve 14 is opened so that the air supplied by pump 11 is all fed to the cooling space 4 which cools the inner shell 3. Accordingly, the temperature of the exhaust gas within the reactor increases when the engine speed increases, but the inner shell 3 is positively cooled by the air passing through space 4. At the same time, since no secondary air is fed to the exhaust gas system the exhaust gas is not reburned within reaction chamber 2 and the temperature of the reactor 1 is not increased. Though the temperature of the inner shell itself is considerably lowered by this air cooling and thus preserved from cracking and corrosion, the temperature within the reaction chamber is only lowered in the area adjacent to the inner shell 3 and, thus, the reburning in reactor 1 is not greatly affected. Accordingly, the material of the inner shell 3 may be less expensive, provide improved durability and constitute a simple structure. Further, since the cooling space 4 acts almost adiabatically, i.e., it cools the inner shell 3 at the same time as it cools the outer shell 5, it prevents the high temperature of inner shell 3 from being transmitted to the outer shell 5 so that the increase in temperature within the engine room may be reduced. Further, since the temperature of the outer shell 5 is relatively low, it is possible to provide a low heat transfer space 7 outside of this outer shell 5 and to fill this space with insulating or noise absorbing material.

A further advantage of the device described above is that since cooling air is supplied to the cooling space 4 only at high engine speeds, the cooling space 4 acts as an insulating space at low speeds and thus shortens the warm-up cycle for the engine.

It is further noted that the opening or closing of the air valve 14 may properly be controlled by the type and usage of the engine or it may be controlled by engine temperature, exhaust gas temperature, or reactor temperature. And, if required, the air control valve 14 may be completely shut off during the warming operation or idling operation of the engine and as the speed increases may be gradually opened.

Further, since the same air pump 11 communicates with the cooling space 4 through the conduit 10 and to the exhaust gas system of the engine through branched conduit 13, all the air from pump 11 becomes secondary air when the control valve 14 is closed and, as the engine speed increases from the idling operation, the supply amount of secondary air is gradually lessened at the same time as the cooling air supplied to the space 4 and is gradually increased. This gradual modification of the cooling air and secondary air streams increases the durability of the reactor and improves working conditions within the engine room without sacrificing the effectiveness of the exhaust gas purifying reactor.

I claim:

1. An exhaust gas purifying device for an internal combustion engine comprising:

an air supply source, a reactor including an inner shell forming a reaction chamber, an exhaust inlet to said reaction chamber, said reactor further including an outer shell surrounding said inner shell and spaced therefrom to define with said inner shell a cooling space, an air inlet provided on said outer shell and communicating with said cooling space, an air outlet provided on said outer shell and communicating directly with the atmosphere, a conduit connected to said air supply source and said air inlet, whereby cooling air passes from said supply source to the cooling space to cool the reactor and thence directly to the atmosphere, an air control valve provided in said conduit for controlling the cooling air supplied to said cooling space, and means responsive to an engine parameter representative of exhaust gas temperature to variably adjust said control valve such as to increase the cooling effect of the inner shell with increased exhaust gas temperature.

2. An exhaust gas purifying device as set forth in claim 1, further including a second conduit branched from said conduit upstream of said air control valve to connect said air supply source to the exhaust gas system of the engine whereby the relation between the amount of cooling air supplied to the cooling space and the secondary air supplied to the reactor is controlled by opening or closing said air control valve.

3. An exhaust gas purifying device for an internal combustion engine comprising:

an air supply source, a reactor including an inner shell forming a reaction chamber, an exhaust inlet to said reaction chamber, said reactor further including an outer shell surrounding said inner shell and spaced therefrom to define with said inner shell a cooling space, insulation means surrounding said outer shell, an air inlet provided on said outer shell and communicating with said cooling space, an air outlet provided on said outer shell and communicating directly with the atmosphere, a conduit connected to said air supply source and said air inlet, whereby cooling air passes from said supply source to the cooling space to cool the reactor and thence directly to the atmosphere, an air control valve provided in said conduit for controlling the cooling air supplied to said cooling space, and means responsive to an operating parameter of said exhaust gas purifying device to variably adjust said control valve such as to increase the cooling effect of the inner shell with increased exhaust gas temperature.

4. An exhaust gas purifying device as set forth in claim 3, further including a second conduit branched from said conduit upstream of said air control valve to connect said air supply source to the exhaust gas system of the engine whereby the relation between the amount of cooling air supplied to the cooling space and the secondary air supplied to the reactor is controlled by opening or closing said air control valve.

* * * * *